United States Patent
Mackey

[19]

[11] Patent Number: 5,956,630
[45] Date of Patent: Sep. 21, 1999

[54] RADIO NECKLACE

[76] Inventor: Ray C. Mackey, 5415 Golf Dr., Houston, Tex. 77091

[21] Appl. No.: 09/110,384

[22] Filed: Jul. 3, 1998

Related U.S. Application Data

[63] Continuation of application No. 08/526,109, Sep. 8, 1995, abandoned, which is a continuation-in-part of application No. 08/271,610, Jul. 7, 1994, abandoned.

[51] Int. Cl.[6] ................................................... H04B 1/08
[52] U.S. Cl. .......................... 455/344; 455/90; 455/575; D11/5; 2/60
[58] Field of Search ..................................... 455/344, 347, 455/348, 349, 350, 351, 89, (550), (566), 100, 90, 154.1–159.1; 381/74, 87, 88; D11/3, 5; 2/60, 300, 312, 338

[56] References Cited

U.S. PATENT DOCUMENTS

| | | | |
|---|---|---|---|
| 3,983,483 | 9/1976 | Pando | 455/90 |
| 4,300,129 | 11/1981 | Cataldo | 340/539 |
| 4,682,363 | 7/1987 | Goldfarb et al. | 381/74 |
| 5,797,088 | 8/1998 | Stamegna | 455/345 |

*Primary Examiner*—Wellington Chin
*Assistant Examiner*—Lee Nguyen
*Attorney, Agent, or Firm*—John R Casperson

[57] ABSTRACT

A portable electronic device having a relatively flat, wide shape which is readily and comfortably worn around an individual's neck and is specifically designed to remain secure during physical activities, such as jogging or walking, and may be worn as a fashion accessory. The necklace includes a case for carrying a radio receiver, a flexible wide band connected to the case for securing the radio to the neck area of the user and at least one earphone. The subject invention also includes a fastener means for securing the band in a closed loop around the neck to form the necklace and providing a one-size-fits-all design.

12 Claims, 2 Drawing Sheets

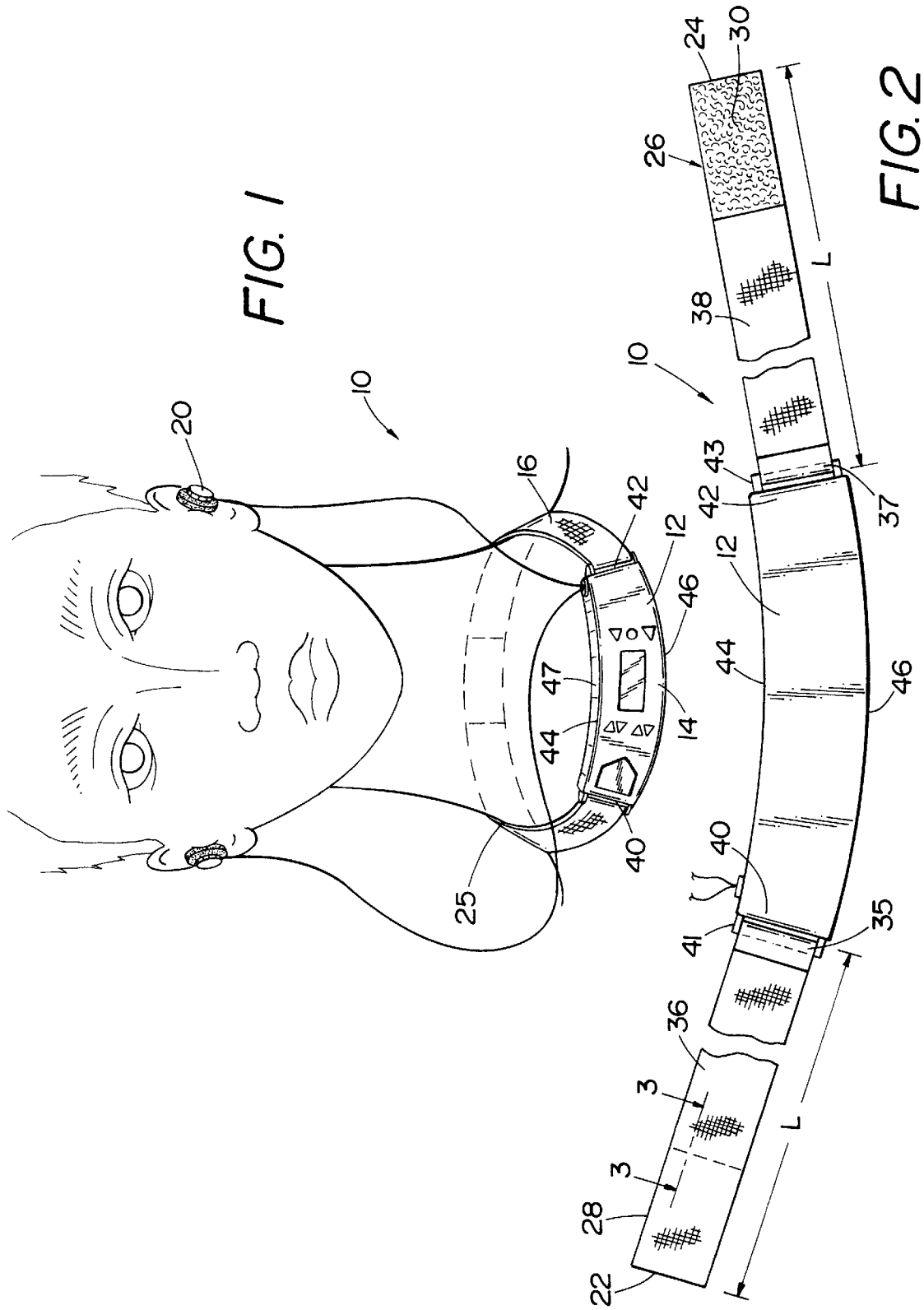

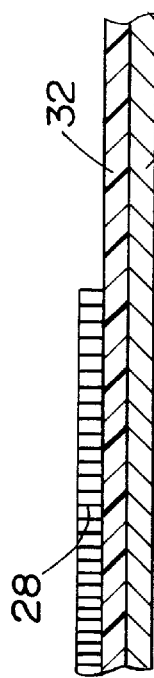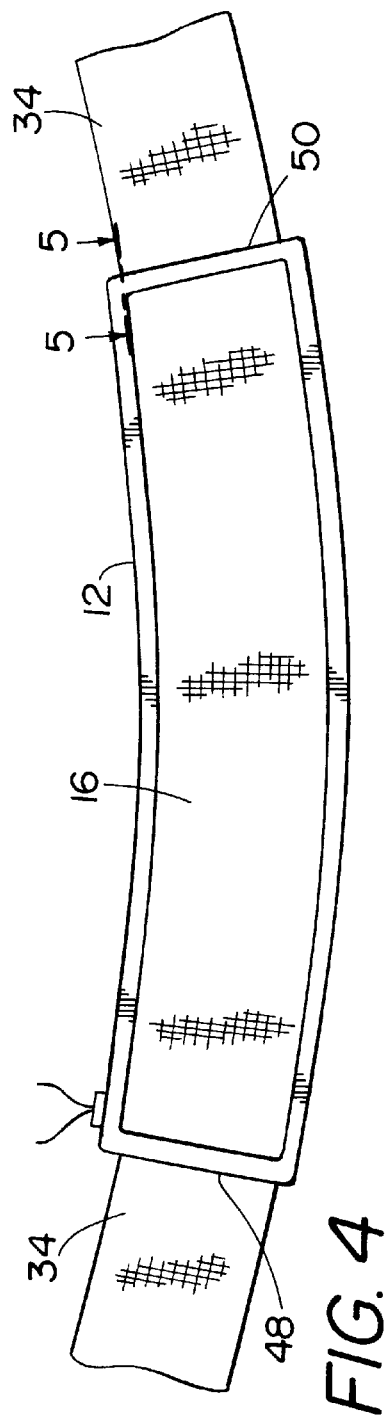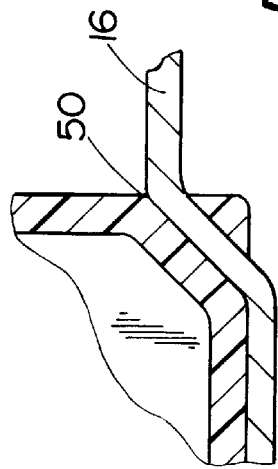

RADIO NECKLACE

This application is a continuation in part of application Ser. No. 08/526,109, filed Sep. 8, 1995, now abandoned, which was in turn a continuation in part of application Ser. No. 08/271,610, filed Jul. 7, 1994, now abandoned.

BACKGROUND OF THE INVENTION

In one aspect, the subject invention is generally related to portable radios which are worn by individual listeners and is specifically directed to a portable radio necklace having a relatively flat, wide shape which is worn comfortably around the individual's neck and designed to remain secure during rigorous activity.

Portable radios which are worn by individual listeners are well known and have gained widespread popularity for use by individuals during activities such as walking or jogging or various other forms of exercise.

Typically, portable or walkabout radios are headphones or small radios with an attachment device for securing the radio to the head of the user. Such radios are bulky head gear and do not enhance the comfort of the wearer. Portable radios with an attachment device for securing the radio to the user's waist are also popular, with loose wires connecting remote earphones from the waist to the user's ears. Wearing the device at the waist may be an impediment to certain activities. In addition, a portable radio with an attachment device may not always be readily attachable to the user. For example, the device may be adapted to be worn on a belt and the user may not be wearing a belt. In either case, the portable radio may be uncomfortable or may move or become unsecured during activity. In addition, such radios are generally unattractive and are not worn except during specified activities.

Pando, U.S. Pat. No. 3,983,483 issued Sep. 28, 1976 relates to a communications device including a radio transmitter and receiver for communicating with a remote station which is worn on the body of the user. The radio transmitter and receiver have been encapsulated so as to be essentially floatable, resilient and waterproof. The required displacement to provide the necessary buoyancy to render the device floatable, resilient and waterproof is achieved by making the device bulky and employing closed cell silicon foam rubber, for example, as the encapsulating material. In order to provide proper function of the transmitter, it is necessary that the device be in intimate contact with the body of the user. This is achieved by providing the device in the form of a collar which fits closely around the neck of the user. The shape and bulkiness of the device, its fit, and the absence of external controls, adjustments, or visual indicators, constitute major aesthetic and functional limitations.

Cataldo, U.S. Pat. No. 4,300,129, issued Nov. 10, 1981 discloses a radio signaling device arranged to be worn around the waist of a user. The device includes a radio transmitter which is disguised as a belt buckle and a switch mechanism so that the user can actuate the device by distension of the waist. The patent is not suggestive of a wearable radio receiver or of configuration as a necklace.

Therefore, there is a need for a portable radio which can be comfortably worn by an individual, is readily attachable to the individual and designed to remain secure while the individual is engaged in various activities. There is a further need to provide such a radio which is an acceptable fashion accessory, permitting more widespread use of the radio.

OBJECTS OF THE INVENTION

It is an object and feature of the subject invention to provide a lightweight, portable radio necklace which is readily and comfortably worn around an individual's neck and is specifically designed to remain secure during physical activities, such as jogging or walking.

It is also an object and feature of the subject invention to provide a portable radio necklace which is attractive and can be worn as a fashion accessory.

It is a further object and feature of the subject invention to provide a radio necklace which includes a relatively flat case for carrying a radio receiver and a wide, flexible band which conforms to the contours of the user's neck are and is connected to the case for securing the case to the user's neck area.

It is also an object and feature of the subject invention to provide a radio necklace which includes a uniquely designed case which encompasses all the components of a radio receiver and is shaped to conform to the user's neck area.

It is yet another object and feature of the subject invention to provide a radio necklace which includes at least one earphone for listening to the radio.

Other objects and features will be readily apparent from the accompanying drawings and description.

SUMMARY OF THE INVENTION

One embodiment of the invention is directed to an apparatus that may be used as a radio necklace having a relatively flat, wide shape which is worn comfortably around an individual's neck and is specifically designed to remain secure during physical activities, such as jogging or walking. The apparatus has an ornamental appearance and is designed to conform to the user's neck area and remain in a fixed position during activity. Because the apparatus is designed to be worn as a necklace, it is readily worn by the user and no attachment devices are necessary. It is attractive and may be worn as an accessory even when not undertaking a physical activity.

The apparatus comprises a case, an electronic device carried by the case, a first strap and a second strap each attached to the case. The case has a first end, a second end, a top edge, a bottom edge. The case also has a front side, a back side and a geometric center. The case is contoured to be worn comfortably and lay flat against an area between the neck and the chest of a user. The first strap has a longitudinal axis and is attached to the first end of the case. The second strap has a longitudinal axis and is attached to the second end of the case. The first strap and the second strap are attached to the case so that the longitudinal axis of the first strap and the longitudinal axis of the second strap intersect at an angle of less than 180 degrees near the geometric center of the case.

In the preferred embodiment, the mechanical assembly of the subject invention includes a lightweight case for carrying a radio receiver and an elongated, flexible band which is connected to the case for securing the portable radio to the neck of the user. The elongated, flexible band has opposite outer ends which include a fastening means, such as Velcro brand hook and eye fasteners, for securing the radio necklace around the user's neck. Similar to a necklace, the band is placed around the neck of the user and the outer ends are joined together to form a closed loop. The subject invention preferably includes a fastening means which allows the radio necklace to be adjusted to provide a one-size-fits-all design.

In the preferred embodiment, the band has a wide design and its exterior is a durable yet flexible plastic which is adapted to conform to the contours of the neck to provide a snug yet comfortable fit. To prevent skin irritation, a soft material, such as a terry cloth fabric, is included on the interior of the band which is against and in contact with the user's neck area. The preferred embodiment may include an elongated, flexible band which consists of two straps connected to the opposite ends of the case for forming the necklace. Alternatively, the band may be a single, elongated strap which is connected to the case and extends behind the case so that the case does not come in contact with the user's neck area.

The case of the preferred embodiment completely encompasses the radio receiver and includes the components of a typical radio such as a tuner, receiver, amplifier and controls for AM/FM bands, station seek, volume buttons, and the like. The case may also include an LCD display window or the like in the center of the case to enable users to visually locate various radio stations. All of the components of the radio are included in the radio necklace of the subject invention. The preferred embodiment of the subject invention includes at least one earphone in communication with the radio receiver for listening to the radio. Because the radio necklace is worn around the neck, an earphone connected to the necklace is readily accessible to the ears of the listener. Also, the earphones of the subject invention may be selected by the user to the comfort of each individual.

In the preferred embodiment, the case has a generally rectangular shape and is constructed from a sturdy, water-resistant plastic. Because of the relatively flat, rectangular shape of the case and wide design of the neck band, the radio necklace of the subject invention is comfortably worn and remains secure during physical activity. In addition, the sides of the case may be curved or contoured for providing a case conforming to and adapted to be comfortably worn in contact with the neck area. Moreover, the curved shape of the case enhances the ornamental appearance of the subject invention.

BRIEF DESCRIPTION OF THE DRAWINGS

FIG. 1 is a perspective view of a portable radio necklace illustrating the necklace as worn around the neck area of a user and showing earphones for listening to the radio.

FIG. 2 is a rear plan view of the radio necklace as removed from the user for illustrating a wide flexible band divided into two straps connected to the ends of a relatively flat case for carrying a radio receiver, and showing a fastening means for adjustably securing the band in a closed loop.

FIG. 3 is a cross-sectional view showing both the top and bottom sides of the flexible band, including the surface of the fastening means and showing a soft cloth on the interior bottom side of the band for preventing irritation.

FIG. 4 is a view similar to FIG. 2 showing an alternative embodiment including a wide, flexible band connected to and extending behind the case.

FIG. 5 is a cross-sectional view showing the band threaded through a slot on the case and extending behind the case.

DETAILED DESCRIPTION OF PREFERRED EMBODIMENTS

Referring to FIGS. 1 and 2, the apparatus of the subject invention is designated generally by the reference numeral 10 and comprises a case 12 for carrying a radio receiver 14, as is well known in the art, and two elongated, flexible straps 16 for securing the radio receiver around the neck area of a user. The case has a first end, a second end, a top edge, a bottom edge. The case also has a front side, a back side and a geometric center. The case is contoured to be worn comfortably and lay flat against an area between the neck and the chest of a user, preferably near or against the top of the sternum of the user.

To accomplish this, the straps preferably extend at an upward angle from the ends of the case. The back side of the case is preferably contoured to be arcuately shaped so that it forms a broad shallow trough extending from the top edge to the bottom edge. The straps have a width which is much greater than their thickness, generally a width which is about the same as the width of the case as measured between the top edge and the bottom edge, and are formed from a material which is sufficiently pliable to conform to the body contours of the user under the weight of the case by bending across the thickness of the strap but sufficiently rigid to resist bending across the width of the strap so that the case will remain positioned near or against the top of the sternum during movement of the user.

The first strap has a longitudinal axis and is attached to the first end of the case. The second strap has a longitudinal axis and is attached to the second end of the case. The first strap and the second strap are attached to the case so that the longitudinal axis of the first strap and the longitudinal axis of the second strap intersect at an angle of less than 180 degrees near the geometric center of the case. The angle is preferably between about 90 degrees and about 170 degrees and more preferably in the range of 145 degrees to 165 degrees. Joining the straps to the case at an upward angle is required in order to cause the case to lay flat near or adjacent the top of the user's sternum. Were an angle of 180 degrees to be used, the case would lay flat only in an area high on the user's neck, which is both uncomfortable and unfashionable, and extending the length of the straps to cause the case to be positioned near the top of the user's sternum would result in the top edge of the case leaning away from the user's body and the bottom edge of the case digging into the user's body, which is also both uncomfortable and unfashionable.

As shown in FIG. 1, the radio necklace 10 has an ornamental appearance and is designed to be fit snugly around the user's neck area and remain in a fixed position during activity. In operation, at least one earphone, such as earphones 20, is readily connected to the radio necklace 10 and placed in communication with the radio receiver 14 for listening to the radio.

In a preferred embodiment, the first end of the case has a top corner and a bottom corner and the second end of the case has a top corner and a bottom corner. The top edge of the case is concave relative to a line extending between the top corner of the first end and the top corner of the second end and generally forms a broad shallow trough extending from the back side to the front side of the case. This shape provides better comfort for the user when the user bends their head forward, as well as having a pleasing appearance. The bottom edge of the case is convex relative to a line extending between the bottom corner of the first end and the bottom corner of the second end and generally forms a broad low ridge extending from the back side of the case to the front side of the case. The case generally has a flattened U-shape or more specifically the shape of a sector of an annulus when viewed from the front side which is both aesthetically pleasing and provides end surfaces on the case which facilitates attachment of the straps to the case at the required angle in a manner which gives the appearance of continuity with the case when the straps have substantially the same width as the case. When this shape is provided, the bottom edge of the case will be longer than the top edge, and the ends of the case will be positioned at an acute angle with respect to each other, generally ranging from about 20 degrees to near 90 degrees, usually in the range of about 15 degrees to about 45 degrees. The case preferably has a thickness as measured between the front side and the back side which is much less than the width of the case as measured between the top edge arid the bottom edge so that the case is relatively flat to avoid interfering with the movements of the user, such as the user bending their head forward. The front side of the case is preferably juxtaposed at a substantially constant distance from the back side of the case. Generally speaking, the width of the case is in the range of about 3 to about 20 times the thickness of the case, usually in the range of from about 5 to about 15 times the thickness of the case, for cases having a width in the range of from about 0.5 to about 2 inches.

In the preferred embodiment, the flexible straps 16 include opposite ends 22 and 24 and is of a length L sufficient to encircle the user's neck area. The straps 16 have a wide design and are contoured to conform to the user's neck area. The straps stabilize the necklace in a relatively fixed position during physical activities, such as jogging, walking and the like. The first strap has a first end and a second end and the second strap has a first end and a second end. The first end of the first strap is connected to the first end of the case and the first end of the second strap is connected to the second end of the case. The second end of the first strap and the second end of the second strap are fastenable to each other for securing the apparatus to the user is neck area. The strap 16 includes a means 26 for attaching the first strap and the second strap to each other. The means for attaching comprises a first fastener attached to the second end 22 of the first strap and a second fastener attached to the second end 24 of the second strap, adjustably securing the necklace in a closed loop 25. The fastening means 26 joins the outer ends 22 and 24 in a manner which permits the user to increase or decrease the size of the closed loop 25 to provide a one-size-fits-all design. The fastening means 26 of the preferred embodiment includes a first fastening element 28 having a plurality of projecting closed loops and a second fastening element 30 having a plurality of projecting hooks, such as by way of example, a Velcro brand fastener. Of course, any suitable fastening means may be used to secure the necklace in the manner well known to those skilled in the art.

In the preferred embodiment, the straps 16 are formed from a durable, plastic material which is adapted to conform to the contours of the neck area thereby providing a snug yet comfortably fitting necklace 10. As shown in FIG. 3, the strap has a top exterior side 32 and a bottom interior side 34 which is directly in contact with the user's neck area. The first strap and the second strap have a length, a width and a thickness. The first strap and the second strap are flexible in a first direction across the thickness and stiff in a second direction across the width. The second direction opposes the first direction. The strap may be layered, with the bottom interior layer 34 being of a soft material, such as a terry cloth fabric, to provide a comfortable surface next to the user's neck area and prevent skin irritation. The top layer 32 is typically of nylon or the like for providing structured strength to minimize stretching.

The case 12 of the preferred embodiment is constructed from a lightweight, sturdy, water-resistant material, such as plastic, and includes opposite ends 40 and 42 and opposite sides 44 and 46. As shown in FIGS. 1 and 2, the case 12 is relatively flat, having a thickness 47 sufficient to house a radio receiver. The sides 44 and 46 are slightly curved for providing a case which conforms to the neck area. The case 12 is generally rectangular shape, with curvilinear sides, and is preferably dimensioned to have an approximate length of 3 inches, a width of 1 ½ inches and a thickness of ½ inch. For example, the length of sides 44 and 46 can be 3 inches, the width of ends 40 and 42 can be 1 ½ inches and the depth of thickness 47 can be ½ inch.

In one embodiment, the s trap 16 includes two straps 36 and 38 having inner ends 35 and 37. The inner ends 35 and 37 of each strap 36 and 38 are connected to the opposite ends 40 and 42 of the case 12. Opposite ends 40 and 42 include loops 41 and 43 for securing the band to the case 12. When the outer ends 22 and 24 are joined, the closed loop 25 is formed to comprise the radio necklace 10. Because of the relatively flat, rectangular shape of the case 12 and wide design of the flexible band 16 securing the case, the radio necklace 10 is comfortably worn around the neck area of the user and remains relatively immobile during physical activity.

An alternative method for securing the case 12 to the band 16 is shown in FIGS. 4 and 5. In the alternative embodiment, the opposite ends 40 and 42 of the case 12 include slots 48 and 50. The band 16 is threaded through the slots 48 and 50 and extends behind the case so that the case rests on the band 16 and does not come into contact with the user's neck area. As in the preferred embodiment, the band 16 is a flexible plastic having a bottom side or layer 34 which includes a terry cloth material for the comfort of the user and the wide design of the band 16 stabilizes the radio necklace 10.

In the preferred embodiment, the radio receiver 14 is completely encased in the case 12 and includes the components of a typical radio, such as a tuner, receiver, and amplifier. A radio transmitter is preferably not included. The front side of the case is provided with controls and visual indicators for selection of AM or FM bands, frequency, and volume, and may include advanced features such as station seek and/or an LCD display window or the like in the center of the case for providing a visual indication of the radio station setting. As shown in FIG. 1, earphones 20 are connected to the radio necklace 10 when worn. Because all of the components are included in the relatively flat case 12 and secured by the flexible band 16, the radio necklace 10 of the subject invention provides a portable radio which is readily and comfortably worn by individuals and is specifically designed to remain secure during activity.

In one embodiment, the invention provides a method for a user to listen to a radio. A radio is provided in a flat case which is contoured to fit near or adjacent to the upper end of the user's sternum. Straps are provided attached to the case and having a length sufficient to be attached behind the users neck. The straps are attached to the case so that the case will lay flat against the body of the user at a location near or adjacent to the upper end of the user's sternum. The user connects the straps behind the user's neck so that the case lays flat against the body of the user at a location near or adjacent to the upper end of the user's sternum, turns on and tunes the radio to a desired station, and adjusts the volume of the radio to a desired level. The user can then listen to the radio while engaging in other activities, and has freedom of use of both hands. In a preferred embodiment, the radio is listened to with at least one earphone, which is attached to the radio and positioned adjacent to the ear of the user.

While specific embodiments and features of the invention have been disclosed herein, it will be readily understood that the invention encompasses all enhancements and modifications within the scope and spirit of the following claims.

What is claimed is:

1. A radio necklace for positioning a radio receiver near or adjacent the upper end of a user's sternum, said radio necklace consisting of:

a. a case a first end, a second end, a top edge, a bottom edge, a front side, a back side and a geometric center, said case being contoured to be worn comfortably and lay flat against an area between the neck and the chest of a user, b. a radio receiver, tuner, and amplifier carried by the case, c. controls and visual indicators for the selection by a user of AM or FM bands, frequency, and volume positioned on the front side of the case;

d. a first strap having a longitudinal axis being attached to the first end of the case, e. a second strap having a longitudinal axis being attached to the second end of the case, wherein the first strap and the second strap are attached to the case so that the longitudinal axis of the first strap and the longitudinal axis of the second strap intersect at an angle of less than 180 degrees near the geometric center of the case, and the first strap and the second strap have a length sufficient to position the case near or adjacent the upper end of the sternum of the user; and f. at least one earphone connected to the case for allowing the user to listen to the radio.

2. A radio necklace as in claim 1, wherein the first strap and the second strap are attached to the case so that the longitudinal axis of the first strap and the longitudinal axis of the second strap intersect at an angle in the range of about 90 degrees to about 170 degrees near the geometric center of the case.

3. A radio necklace as in claim 1, wherein the first strap is attached to the first end of the case and the second strap is attached to the second end of the case so that the longitudinal axis of the first strap and the longitudinal axis of the second strap intersect at an angle in the range of about 145 to about 165 degrees near the geometric center of the case.

4. A radio necklace as in claim 1, wherein the first end of the case has a top corner and a bottom corner and the second end of the case has a top corner and a bottom corner, the top edge of the case being concave relative to a line extending between the top corner of the first end and the top corner of the second end and forming a broad shallow trough extending from the back side to the front side of the case; and the bottom edge of the case being convex relative to a line extending between the bottom corner of the first end and the bottom corner of the second end, and form a broad low ridge extending from the back side to the front side of the case;

said case generally having a flattened U-shape when viewed from the front side.

5. A radio necklace as in claim 4 wherein the back side of the case is contoured to be arcuately shaped so that it forms a broad shallow trough extending from the top edge to the bottom edge of the case, and the front side of the case is juxtaposed at a substantially constant distance from the back side of the case.

6. A radio necklace as in claim 5 wherein case has a thickness as measured between the front side and the back side which is much less than the width of the case as measured between the top edge and the bottom edge so that the case is relatively flat to avoid interfering with the movements of the user.

7. A radio necklace as in claim 6 wherein the width of the case is in the range of about 3 to about 20 times the thickness of the case.

8. A radio necklace as in claim 7 wherein the width of the case is in the range of about 5 to about 15 times the thickness of the case.

9. A radio necklace as in claim 4, wherein the case generally has a shape of a sector of an annulus when viewed from the front side.

10. A radio necklace as in claim 7, wherein the first strap comprises a first end and a second end and the second strap comprises a first end and a second end, the first end of the first strap being connected to the first end of the case and the first end of the second strap being connected to the second end of the case, the second end of the first strap and the second end of the second strap being fastenable to each other for securing the radio necklace to the user's neck area.

11. A radio necklace as in claim 10, wherein said first strap and said second strap are formed from durable, flexible plastic.

12. A radio necklace as in claim 11, wherein the first strap and the second strap have a length, a width and a thickness and are flexible in a first direction across the thickness and stiff in a second direction across the width, wherein said second direction opposes said first direction.

* * * * *